(12) United States Patent
Singleton et al.

(10) Patent No.: US 7,035,061 B2
(45) Date of Patent: Apr. 25, 2006

(54) MAGNETORESISTIVE TRANSDUCER WITH LOW MAGNETIC MOMENT, HIGH COERCIVITY STABILIZING MAGNETS

(75) Inventors: Eric W. Singleton, Maple Plain, MN (US); David J. Larson, Northfield, MN (US); Christopher L. Platt, Pittsburgh, PA (US); Kurt W. Wierman, Pittsburgh, PA (US); James K. Howard, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 191 days.

(21) Appl. No.: 10/464,343

(22) Filed: Jun. 18, 2003

(65) Prior Publication Data

US 2004/0047089 A1  Mar. 11, 2004

Related U.S. Application Data

(60) Provisional application No. 60/409,887, filed on Sep. 11, 2002.

(51) Int. Cl.
*G11B 5/39* (2006.01)

(52) U.S. Cl. .............................. 360/324.12; 360/327.31

(58) Field of Classification Search ................ 360/317, 360/324.1, 324.11, 324.12, 324.2, 327.31
See application file for complete search history.

(56) References Cited

U.S. PATENT DOCUMENTS

| | | | |
|---|---|---|---|
| 5,287,237 A | 2/1994 | Kitada et al. | 360/327.32 |
| 5,508,866 A | 4/1996 | Gill et al. | 360/327.2 |
| 5,528,440 A | 6/1996 | Fontana et al. | 360/324.12 |
| 5,666,246 A * | 9/1997 | Gill et al. | 360/327.23 |
| 5,742,459 A | 4/1998 | Shen et al. | 360/327.32 |
| 5,748,416 A * | 5/1998 | Tobise et al. | 360/324.12 |
| 5,883,764 A | 3/1999 | Pinarbasi | 360/322 |
| 5,936,810 A | 8/1999 | Nakamoto et al. | 360/324.1 |
| 5,989,728 A * | 11/1999 | Coffey et al. | 428/611 |
| 6,094,325 A | 7/2000 | Tagawa et al. | 360/324.12 |
| 6,111,722 A * | 8/2000 | Fukuzawa et al. | 360/324.12 |
| 6,118,624 A * | 9/2000 | Fukuzawa et al. | 360/324.12 |
| 6,146,776 A * | 11/2000 | Fukuzawa et al. | 428/692 |
| 6,373,667 B1* | 4/2002 | Han et al. | 360/327.22 |
| 6,847,509 B1* | 1/2005 | Yoshikawa et al. | 360/324.12 |
| 6,857,180 B1* | 2/2005 | Horng et al. | 29/603.14 |
| 2002/0015268 A1* | 2/2002 | Mao et al. | 360/324.12 |
| 2002/0044393 A1* | 4/2002 | Seigler et al. | 360/324 |
| 2002/0098381 A1* | 7/2002 | Coffey et al. | 428/694 T |
| 2002/0150791 A1 | 10/2002 | Yuasa et al. | 428/811 |
| 2003/0228488 A1* | 12/2003 | Covington et al. | 428/692 |
| 2005/0264957 A1* | 12/2005 | Li et al. | 360/324.12 |

OTHER PUBLICATIONS

*Handbook of Ternary Alloy Phase Diagrams*, P. Villars, A. Prince, and H. Okamoto, vol. 7, pp. 9298, 9406-9407.
*Reduction in L10 Ordering Temperature in FePt by the Addition of Ag*, http://bama.ua.edu/~mint/Reduction_in_L10_FePt.htm.

* cited by examiner

*Primary Examiner*—Jefferson Evans
(74) *Attorney, Agent, or Firm*—Kinney & Lange, P.A.

(57) ABSTRACT

A transducing head includes a first bias element, a second bias element, and a magnetoresistive sensor positioned between the first bias element and the second bias element. The first bias element and the second bias element are each formed of a permanent magnet material having a remanent magnetic moment in a range of about 200 to about 800 emu/cm³. In a preferred embodiment, the permanent magnet material is an alloy comprising iron, platinum, and at least one material selected from copper, silver, magnesium, lead, zinc, bismuth, and antimony.

31 Claims, 11 Drawing Sheets

MAGNETORESISTIVE TRANSDUCER WITH LOW MAGNETIC MOMENT, HIGH COERCIVITY STABILIZING MAGNETS

CROSS-REFERENCE TO RELATED APPLICATION(S)

This application claims priority from provisional U.S. patent application Ser. No. 60/409,887 of Eric Walter Singleton, David James Larson, Christopher Loren Platt, Kurt Warren Wierman, and James Kent Howard, filed on Sep. 11, 2002 and entitled, "Concept and Method for Magnetoresistive Transducer with Low Moment Symmetric Stabilizing Magnet."

BACKGROUND OF THE INVENTION

The present invention relates generally to the field of magnetic data storage and retrieval systems. More particularly, the present invention relates to a transducing head having a magnetoresistive sensor stabilized by permanent magnet bias elements having a low magnetic moment and a high coercivity.

A transducing head of a magnetic data storage and retrieval system typically includes a magnetoresistive (MR) reader portion for retrieving magnetic data stored on a magnetic media. The reader is typically formed of several layers which include an MR sensor positioned between two insulating layers, which are in turn positioned between two shield layers. The MR sensor may be any one of a plurality of MR-type sensors, including, but not limited to, anisotropic magnetoresistive (AMR), giant magnetoresistive (GMR), tunneling giant magnetoresistive (TMR), spin valve, and spin tunneling sensors.

When the transducing head is placed near a magnetic medium, a resistance of the MR sensor fluctuates in response to a magnetic field emanating from written transitions in the magnetic medium. By providing a sense current through the MR sensor, the resistance of the sensor can be measured and used by external circuitry to decipher the information stored on the magnetic medium.

To operate the MR sensor properly, the sensor must be stabilized against the formation of edge domains because domain wall motion results in electrical noise that makes data recovery difficult. A common way to achieve stabilization is with a permanent magnet abutted junction design in which permanent magnet bias elements directly abut opposite sides of the MR sensor. Permanent magnets have a high coercive field (i.e. are hard magnets). The magnetostatic field from the permanent magnets stabilizes the MR sensor, prevents edge domain formation, and provides proper bias.

In recent years, MR sensor widths have been decreased to accommodate ever-increasing areal densities of magnetic media. But, with a decrease in MR sensor widths, it has been important to maintain constant MR sensor output by increasing MR sensor sensitivity. In prior art designs, this goal has been accomplished by several methods, including decreasing a thickness of a sensing layer of the MR sensor and/or reducing a thickness of the permanent magnet bias elements and/or recessing the permanent magnet bias elements a distance from the MR sensor (a method introduced by U.S. patent application Ser. No. 10/027,051, hereby incorporated by reference) and/or shortening a length of the permanent magnet bias elements (a method introduced by U.S. patent application Ser. No. 10/348,386, hereby incorporated by reference).

In the case of reducing the permanent magnet thickness, process-control issues exist with creating ever-thinner permanent magnet layers in a volume manufacturing environment. Namely, it is difficult with thinner permanent magnets to achieve consistent thicknesses of the layers, particularly across a wafer upon which tens of thousands of MR sensors are built. That is, the permanent magnets formed near the center of the wafer may be thicker than the permanent magnets formed near the edge of the wafer. Also, the photolithographic processes employed in forming the permanent magnet layer may result in the two permanent magnets associated with one MR sensor having unequal thicknesses. As the thickness of the permanent magnet bias elements is decreased, this asymmetry in thickness becomes a substantially large percentage of the total MR sensor thickness. For instance, an asymmetry of 50 Angstroms would result in a 50% difference in thickness across the wafer for a targeted 100 Angstroms thick permanent magnet, whereas it would be only a 10% difference for a targeted 500 Angstroms thick permanent magnet.

In addition to permanent magnet asymmetry, error may arise in the permanent magnet positioning with respect to a sensing layer of the MR sensor. The positioning error may result from a variety of factors, including thickness variation of deposited layers in the process of forming a MR sensor and photolithography process variations in the process of forming a MR sensor. The positioning error may result in a response variation of a MR sensor.

Thus, there is a need for a MR sensor design having increased sensitivity without requiring a decrease in thickness of the permanent magnets.

BRIEF SUMMARY OF THE INVENTION

A transducing head includes a first bias element, a second bias element, and a magnetoresistive sensor positioned between the first bias element and the second bias element. The first bias element and the second bias element are each formed of a permanent magnet material having a remanent magnetic moment in a range of about 200 to about 800 emu/cm$^3$. In a preferred embodiment, the permanent magnet material is an alloy comprising iron, platinum, and at least one material selected from copper, silver, magnesium, lead, zinc, bismuth, and antimony.

DETAILED DESCRIPTION

Figure 1:
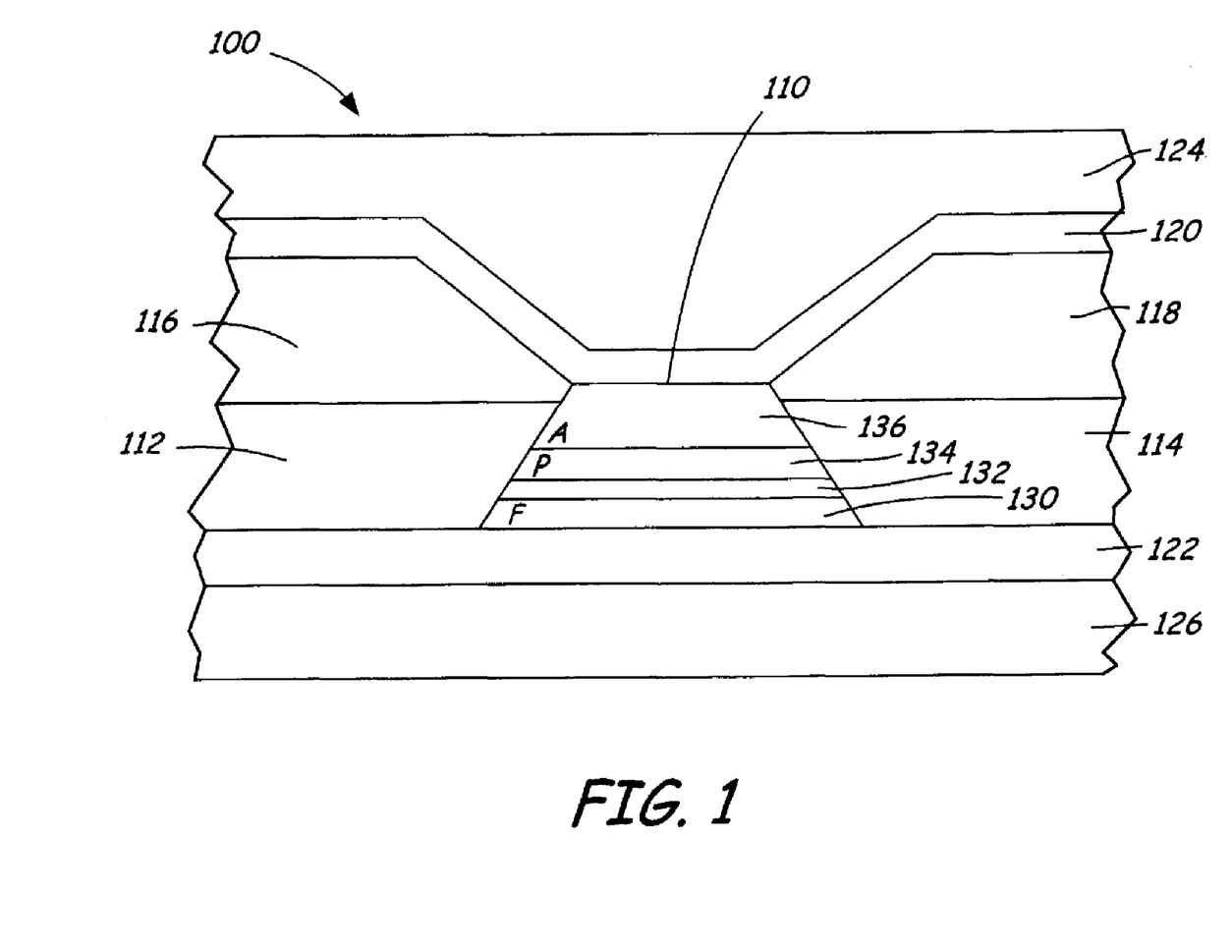
FIG. 1 is a cross-sectional view of a first embodiment of a current-in-plane transducing head in accord with the present invention.

FIG. 1 is a cross-sectional view of a first embodiment of current-in-plane (CIP) transducing head 100 in accord with the present invention. Transducing head 100 includes magnetoresistive (MR) sensor 110, first and second permanent magnet (PM) bias elements 112 and 114, first and second contacts 116 and 118, top and bottom insulating layers 120 and 122, and top and bottom shields 124 and 126.

MR sensor 110 is a multilayer device operable to sense magnetic flux from a magnetic media. MR sensor 110 may be any one of a plurality of MR-type sensors, including, but not limited to, AMR, GMR, TMR, spin valve and spin tunneling sensors. At least one layer of MR sensor 110 is a sensing layer, such as a free layer of a GMR spin valve sensor, that requires longitudinal biasing. Moreover, for several types of MR sensors, at least one layer of MR sensor 110 is an antiferromagnetic layer that requires annealing to set a magnetization direction therein.

For illustrative purposes only, MR sensor 110 of FIG. 1 is shown as a top spin valve having sensing layer 130, spacer layer 132, pinned layer 134, and antiferromagnetic layer 136. Spacer layer 132 is positioned between sensing layer 130 and pinned layer 134, and pinned layer 134 is positioned between antiferromagnetic layer 136 and spacer layer 132. Sensing layer 130 and pinned layer 134 are each generally formed of at least one layer of a ferromagnetic material, while spacer layer 132 is formed of a nonmagnetic material. The magnetization of sensing layer 130 rotates freely in response to external magnetic field emanating from a magnetic medium, while the magnetization of pinned layer 134 is fixed in a predetermined direction. The magnetization of pinned layer 134 is fixed by exchange coupling antiferromagnetic layer 136 with pinned layer 134. The resistance of MR sensor 110 varies as a function of an angle that is formed between the magnetization of sensing layer 130 and the magnetization of pinned layer 134.

First and second PM bias elements 112 and 114 abut opposite sides of MR sensor 110 to provide longitudinal biasing to the sensing layer of MR sensor 110. The magnetic field from PM bias elements 112 and 114 stabilizes, prevents edge domain formation, and provides proper bias for the sensing layer of MR sensor 110. In this embodiment, PM bias elements 112 and 114 are each exchanged coupled to MR sensor 110. In a preferred embodiment, first PM bias element 112 has a thickness in a range of about one to about three times a thickness of MR sensor 110 and second PM bias element 114 has a thickness substantially equal to the thickness of first PM bias element 112. More specifically, PM bias elements 112 and 114 each preferably have a thickness in a range of about 200 Angstroms to about 1000 Angstroms.

In prior art designs, PM bias elements 112 and 114 generally would have been formed of a high magnetic moment, high coercivity, magnetic material, such as CoCrPt, CoCr, CoCrTa, CoCrTaPt, CoPt, or CoNiCr. As detailed above in the background section, this prior art implementation poses design problems as MR sensor widths have decreased. Specifically, the biasing field exerted by PM bias elements 112 and 114 is too powerful, and over-pins the magnetization of the sensor layer of MR sensor 110, thereby having negative effects on MR sensor sensitivity. As also detailed above, others have addressed this problem by thinning PM bias elements 112 and 114 and/or recessing PM bias elements 112 and 114 a distance from MR sensor 110 and/or shortening PM bias elements 112 and 114.

The present invention, however, addresses this problem by utilizing a low remanent magnetic moment, high coercivity, magnetic material for PM bias elements 112 and 114. The present invention recognizes that PM bias elements formed of a material having a low remanent magnetic moment, specifically one having a remanent moment in a range of about 200 to about 800 emu/cm$^3$, will exert a smaller longitudinal biasing field upon the sensing layer of MR sensor 110 than PM bias elements formed of a high magnetic moment material, thereby improving the sensitivity of MR sensor 110. Another important characteristic of PM bias elements 112 and 114 is a high magnetic coercivity, preferably in a range of about 2000 Oersteds (Oe) to about 6000 Oe. Moreover, it is generally preferred that the material used to form PM bias elements 112 and 114 be corrosion resistant.

The remanent magnetic moment required of PM bias elements 112 and 114 is dependent upon the desired stability coefficient of transducing head 100. The stability coefficient SC is defined as:

$$SC = \frac{M_R t_{PM}}{M_S t_{MR}}$$

where $M_R$ is the remanent magnetization of PM bias elements 112 and 114, $t_{PM}$ is the thickness of PM bias elements 112 and 114, $M_S$ is the saturation magnetization of sensing layer 130, and $t_{MR}$ is the thickness of sensing layer 130. As known by those skilled in the art, the desired magnetic moment of PM bias elements 112 and 114 is also affected by a reader width of MR sensor 110, composition of sensing layer 130, and the distance PM bias elements 112 and 114 are recessed from MR sensor 110, among other factors.

First and second contacts 116 and 118 are formed respectively on PM bias elements 112 and 114. Contacts 116 and 118 abut opposite sides of MR sensor 110. Contacts 116 and 118 function to provide a sense current to MR sensor 110 in a direction substantially parallel to a plane of the layers of MR sensor 110. As is generally known in the industry, the sense current is passed through MR sensor 110 to detect changes in the resistivity of MR sensor 110, which is indicative of the data stored on the magnetic medium being read. Contacts 116 and 118 are typically formed of conductive materials, such as, but not limited to, tantalum, rhodium, titanium, tungsten, chromium, copper, gold or silver. Contacts 116 and 118 are commonly formed with a thickness in a range of about 50 Angstroms to about 1000 Angstroms.

Top insulating layer 120 is formed adjacent MR sensor 110 and adjacent contacts 116 and 118. Bottom insulating layer 122 is formed adjacent MR sensor 110 and adjacent PM bias elements 112 and 114. Insulating layers 120 and 122 abut opposite sides of MR sensor 110. Insulating layers 120 and 122 function to magnetically decouple MR sensor 110 from shields 124 and 126. Insulating layers 120 and 122 are formed of a nonmagnetic, electrically insulating material, and are commonly formed with a thickness in a range of about 50 Angstroms to about 300 Angstroms.

Top shield 124 is formed on insulating layer 120 opposite MR sensor 110 and contacts 116 and 118. Bottom shield 126 is formed adjacent insulating layer 122 opposite MR sensor 110 and PM bias elements 112 and 114. Shields 124 and 126 are formed on opposite sides of MR sensor 110. MR sensor 110 reads only that information stored directly beneath it on a specific track of the magnetic medium because shields 124 and 126 function to absorb any stray magnetic fields emanating from adjacent tracks and transitions.

Figure 2:
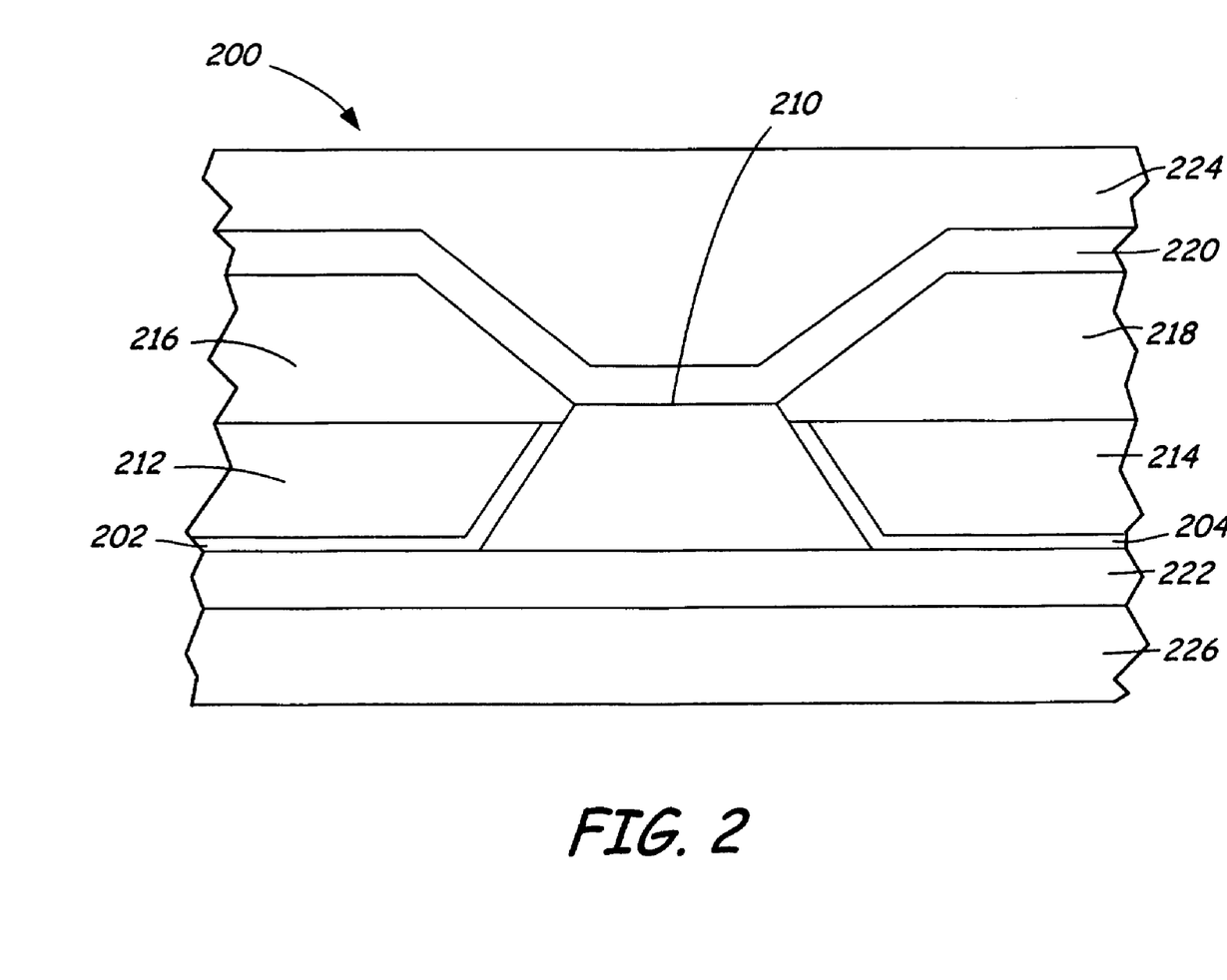
FIG. 2 is a cross-sectional view of a second embodiment of a current-in-plane transducing head in accord with the present invention.

FIG. 2 is a cross-sectional view of a second embodiment of CIP transducing head 200 in accord with the present invention. Transducing head 200 includes first and second PM seed layers 202 and 204, MR sensor 210, first and second PM bias elements 212 and 214, first and second contacts 216 and 218, top and bottom insulating layers 220 and 222, and top and bottom shields 224 and 226.

Transducing head 200 is similar to transducing head 100 of FIG. 1, with the exception that transducing head 200 includes first and second seed layers 202 and 204. For that reason, elements common to both FIGS. 1 and 2 are like-numbered in the last two digits, for example CIP transducing head 100 and CIP transducing head 200. Moreover, the discussion pertaining to those elements common to both FIGS. 1 and 2 with reference to FIG. 1 applies equally to their inclusion in FIG. 2, and thus, will not be repeated below.

First and second PM seed layers 202 and 204 are deposited upon portions of bottom gap 222 not covered by MR sensor 210 and on opposite sides of MR sensor 210. PM seed layers 202 and 204 help to promote a desired texture and to enhance a desired grain growth of PM bias elements 212 and 214 grown thereon. Moreover, PM seed layers 202 and 204 function to magnetically decouple PM bias elements 212 and 214 from MR sensor 210. In this embodiment, PM bias elements 112 and 114 are each magnetostatically coupled to MR sensor 210. In a preferred embodiment, PM seed layers 202 and 204 each have a thickness less than about 100 Angstroms.

Figure 3:
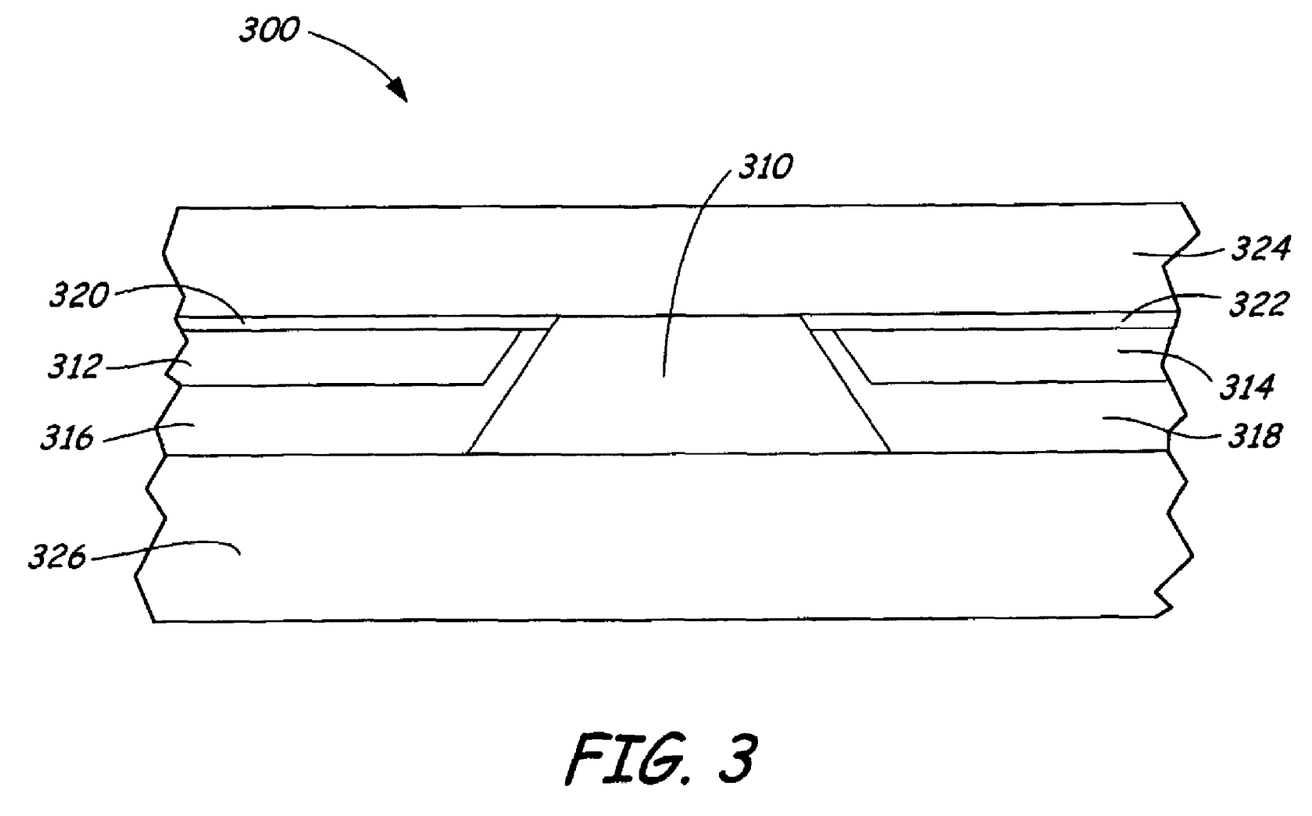
FIG. 3 is a cross-sectional view of a current-perpendicular-to-plane transducing head in accord with the present invention.

FIG. 3 is a cross-sectional view of current-perpendicular-to-plane (CPP) transducing head 300 in accord with the present invention. Transducing head 300 includes tunneling giant magnetoresistive (TMR) sensor 310, PM bias elements 312 and 314, insulating layers 316, 318, 320, and 322, and top and bottom shields 324 and 326. CPP transducing head 300 differs from CIP transducing heads 100 and 200 in that the sense current provided to TMR sensor 310 is provided in a direction substantially perpendicular to the planes of layers (not shown) of TMR sensor 310, rather than in a direction substantially parallel.

TMR sensor 310 is a multilayer device operable to sense magnetic flux from a magnetic media. At least one layer of TMR sensor 310 is a sensing layer that requires longitudinal biasing. Moreover, TMR sensor 310 may include an antiferromagnetic layer that requires annealing to set a magnetization direction therein.

First and second PM bias elements 312 and 314 are positioned on opposite sides of TMR sensor 310 to provide longitudinal biasing to the sensing layer of TMR sensor 310. PM bias elements 312 and 314 are recessed from TMR sensor 310 a distance in a range of about 20 Angstroms to about 300 Angstroms. Thus, PM bias elements 312 and 314 are magnetostatically coupled with TMR sensor 310. PM bias elements 312 and 314 are otherwise similar to PM bias elements 112 and 114 of FIG. 1 and PM bias elements 212 and 214 of FIG. 2.

Insulating layer 316 is positioned between bottom shield 326 and first PM bias element 312, and also between first PM bias element 312 and TMR sensor 310. Similarly, insulating layer 318 is positioned between bottom shield 326 and second PM bias element 314, and is also positioned between second PM bias element 314 and TMR sensor 310. Insulating layers 320 and 322 are positioned on a respective one of PM bias elements 312 and 314 on opposing sides of TMR sensor 310. Insulating layers 316, 318, 320, and 322 function to magnetically decouple TMR sensor 310 from shields 324 and 326. Insulating layers 316, 318, 320, and 322 also preferably function to minimize the shunting of sense current from TMR sensor 310 to PM bias elements 312 and 314. Each of insulating layers 316, 318, 320, and 322 is formed of nonmagnetic material, and are commonly formed with a thickness in a range of about 50 Angstroms to about 300 Angstroms.

Top shield 324 is formed adjacent to TMR sensor 310 and insulating layers 320 and 322. Bottom shield 326 is formed adjacent to TMR sensor 310 and insulating layers 316 and 318. Shields 324 and 326 are formed on opposite sides of TMR sensor 310. TMR sensor 310 reads only information stored directly beneath it on a specific track of a magnetic medium because shields 324 and 326 function to absorb any stray magnetic fields emanating from adjacent tracks and transitions. In addition, shields 324 and 326 function to provide a sense current to TMR sensor 310 in a direction substantially perpendicular to planes of layers (not shown) of TMR sensor 310. Sense current is passed through TMR sensor 310 to detect changes in the resistivity of TMR sensor 310, which are indicative of the data stored on the magnetic medium being read. Shields 324 and 326 preferably are composed of a soft magnetic material, such as, but not limited to, an NiFe alloy. Shields 324 and 326 are commonly formed with a thickness in a range of about one-tenth micron to about ten microns.

While the present invention contemplates the use of any low magnetic moment, high coercivity, corrosion resistant permanent magnetic material, one material found to perform well is an alloy formed of at least iron, platinum, and A, where A may be copper, gold, silver, magnesium, lead, zinc, bismuth, antimony, or another suitable material. A may also be an alloy of copper and at least one of gold, silver, magnesium, nickel-oxide, lead, zinc bismuth, antimony, or another suitable material. This alloy can be represented as:

$$(Fe_{100-Y}Pt_Y)_{100-Z}A_Z$$

where Y represents an atomic percentage of platinum in the alloy relative to an atomic percentage of iron, and Z represents the atomic percentage of element A in the alloy. A preferred range for Y is between 35 and 65 atomic percent and for Z is between 0 and 60 atomic percent. A more preferred range for Y is between 40 and 60 atomic percent and for Z is between 15 and 40 atomic percent.

Figure 4:
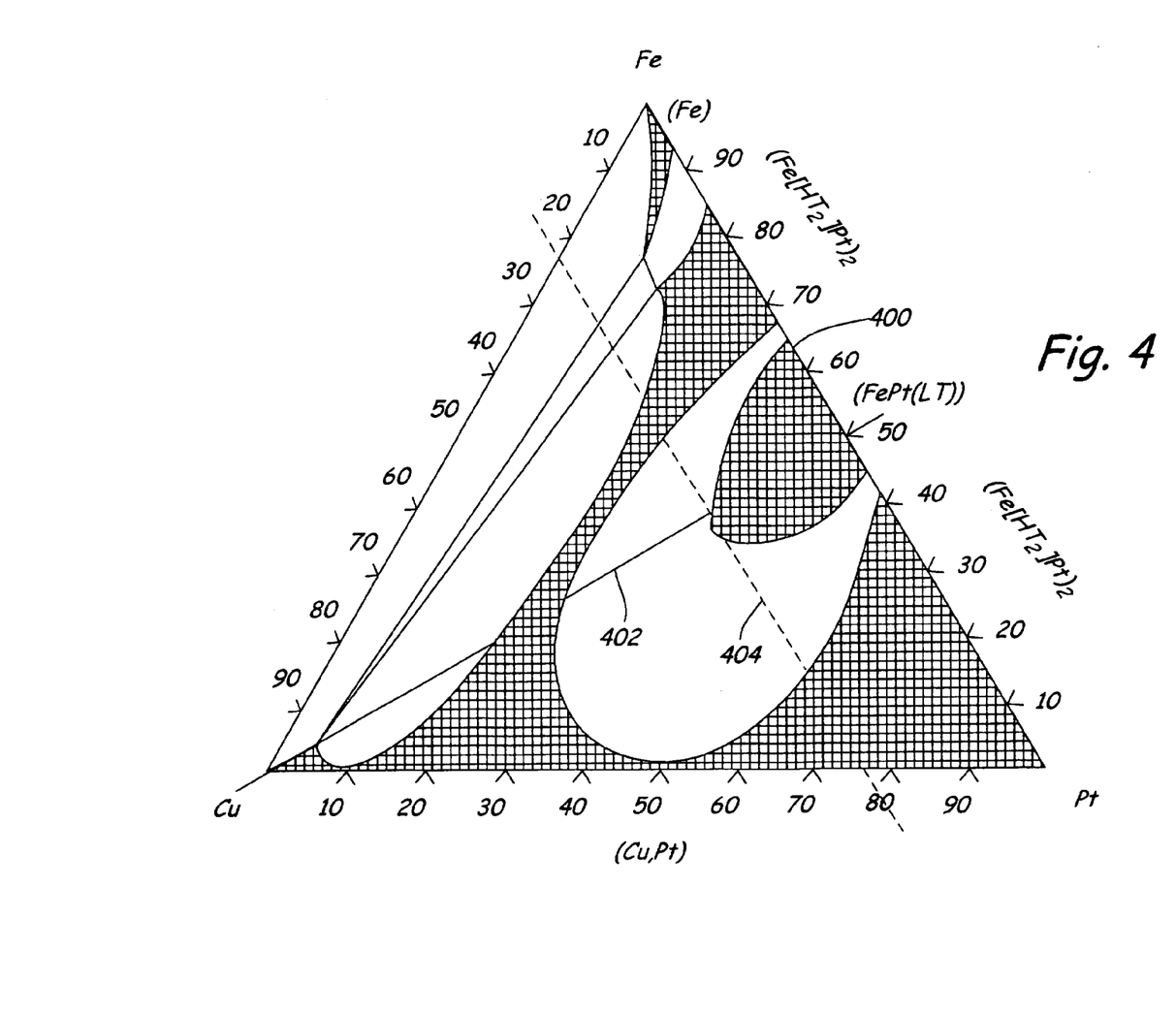
FIG. 4 is a ternary alloy phase diagram for a copper-iron-platinum alloy at 600° C. This phase diagram is taken from page 9407 of Volume 7 of *Handbook of Ternary Alloy Phase Diagrams*, ASM International (1995).

A most preferred permanent magnet material is iron-platinum-copper. FIG. 4 is a ternary alloy phase diagram for a copper-iron-platinum alloy at 600° C. This phase diagram is taken from page 9407 of Volume 7 of *Handbook of Ternary Alloy Phase Diagrams*, ASM International (1995). Region 400 of the phase diagram represents those combinations of copper, iron, and platinum having a composition close to the $L1_0Fe_{50}Pt_{50}$ phase, a low magnetic moment and which retain the desired one-phase micro-structure (desired for good for magnetic properties). In FIG. 4, line 402 identifies $Fe_{50}Pt_{50}$, while line 404 identifies a percentage of copper at point 402, defined as the intersection of line 402 with region 400. More specifically, point 402 identifies a combination of copper, iron, and platinum having about 78% $Fe_{50}Pt_{50}$ and 22% copper.

For alloys of iron, platinum, and copper annealed at lower temperatures, the boundaries of region 400 will move. Thus, a desired range of atomic percentages of copper in the alloy is about 16 to about 40.

The ability to substitute a large amount of A in this alloy allows for a potentially large reduction of magnetic moment compared to pure iron-platinum in the $L1_0$ phase. However, the addition of a large of amount of A into the $(Fe_{100-Y}Pt_Y)_{100-Z}A_Z$ alloy may modify the $L1_0$ ordering kinetics. To function as biasing elements, PM bias elements 112 and 114 formed of the $Fe_{100-Y}Pt_Y)_{100-Z}Cu_Z$ alloy must be annealed to transform the $(Fe_{100-Y}Pt_Y)_{100-ZCuz}$ alloy into the $L1_0$ crystalline phase. Since several elements of the transducing head generally cannot withstand annealing temperatures in excess of 300° C., an advantage of the $(Fe_{100-Y}Pt_Y)_{100-Z}Cu_Z$ alloy is that Cu aids growth of the $L1_0$ phase at low temperatures, more specifically, at temperatures less than 350° C.

Figure 5:
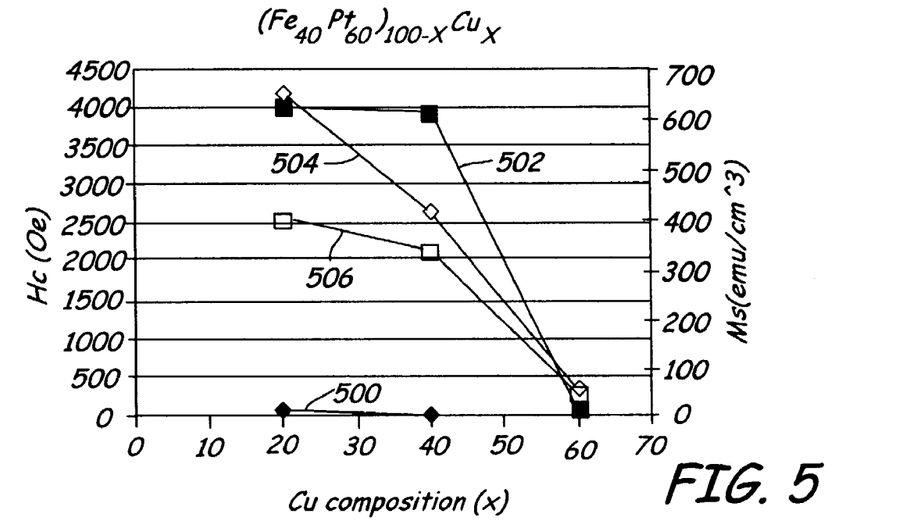
FIGS. 5 and 6 are graphs illustrating an effect of an atomic percentage X of copper in a $(Fe_{40}Pt_{60})_{100-X}Cu_X$ alloy, deposited as a film, on saturation magnetization $M_S$ and coercivity $H_C$ of the film, as well as coercivity $H_C$ of a $(Fe_{40}Pt_{60})_{100-X}Cu_X$ alloy, deposited as a film, as related to the temperature at which the film was annealed for four hours.

FIG. 5 is a graph illustrating an effect of an atomic percentage X of copper in a $(Fe_{40}Pt_{60})_{100-X}Cu_X$ alloy, deposited as a film, on saturation magnetization $M_S$ (which is indicative of magnetic moment) and coercivity $H_C$ of the film. The film illustrated in FIG. 5 was deposited to 1000 Angstroms thick, and was annealed at 300° C. for four hours. Line 500 of FIG. 5 illustrates the effect of copper in the film on coercivity $H_C$ of the unannealed film, while line 502 illustrates the effect on the annealed film. Similarly, line 504 illustrates the effect of copper on the saturation magnetization $M_S$ of the unannealed film, while line 506 illustrates the effect on the annealed film. For reference, the saturation magnetization $M_S$ of common prior art permanent magnets is about 800 emu/cc and the saturation magnetization $M_S$ of un-doped iron-platinum is about 1000 emu/cc. By substantially reducing the magnetic moment of the PM bias elements to about 400 emu/cc, one may design a transducing head having PM bias elements sufficiently thick to greatly reduce the position variation and magnet asymmetry associated with ever-thinner prior art PM bias elements.

An additional advantage associated with the selection of low magnetic moment alloys of iron, platinum, and copper includes the fact that the copper composition can be varied over some range to allow the designer to tune the remanent magnetic moment in conjunction with a desired thickness of the PM bias elements to provide a desired stability coefficient to stabilize the sensing layer of the MR sensor.

Moreover, the $(Fe_{40}Pt_{60})_{100-X}Cu_X$ alloy does not require a seed layer, thus allowing for greater flexibility in the design of transducing heads in accord with the present invention. Accordingly, the designer may choose to use a buffer layer or seed layer beneath the PM bias elements of only tens of Angstroms thick to hundreds of Angstroms thick to magnetically decouple the PM bias elements from the sensing layer of the MR sensor. Or, the designer may choose to use no buffer or seed layer, thereby ferromagnetically coupling the PM bias elements to the sensing layer of the MR sensor. The magnetic materials traditionally used for forming PM bias elements require a seed layer to develop a sufficiently high magnetic coercivity.

Figure 6:
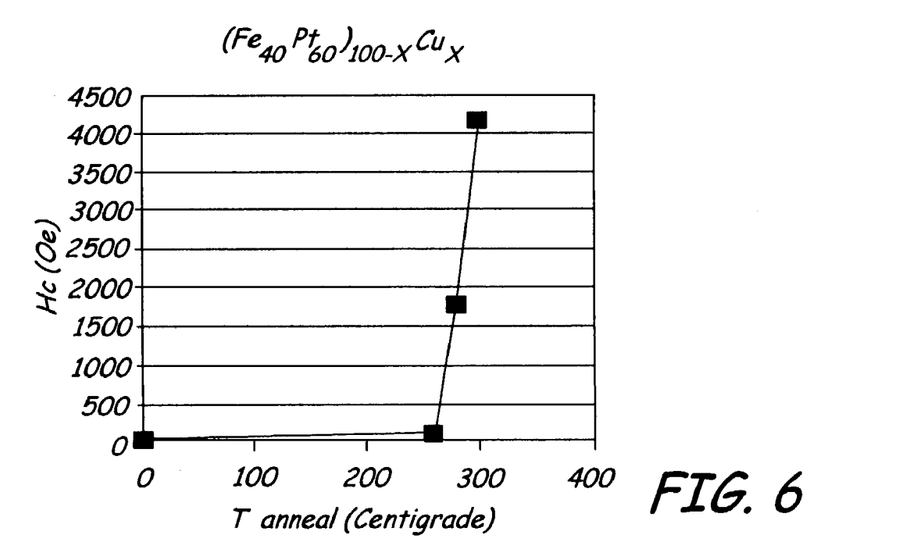

Another advantage of the $(Fe_{40}Pt_{60})_{100-X}Cu_X$ alloy is its relatively low ordering temperature. To obtain the magnetically hard $L1_0$ phase, the $(Fe_{40}Pt_{60})_{100-X}Cu_X$ PM bias elements must be annealed. Because of the low anneal temperature, the PM bias elements may be annealed simultaneously with the annealing of an antiferromagnetic layer that may be included in the MR sensor required to set an anisotropy direction of the antiferromagnetic layer. FIG. 6 is a graph illustrating coercivity $H_C$ of the $(Fe_{40}Pt_{60})_{100-X}Cu_X$ alloy, deposited as a film 800 Angstroms thick, as related to the temperature at which the film was annealed for four hours. As shown in FIG. 6, coercivity $H_C$ of the film increases substantially with an anneal of at least 280° C., and is preferably at least 300° C. for use in conjunction with transducing heads. One advantage of simultaneously annealing the PM bias elements and an antiferromagnetic layer of the MR sensor is that a large shape anisotropy resulting from a definition of a reader width of the MR sensor helps to define the anisotropy direction of the antiferromagnetic layer.

The $(Fe_{40}Pt_{60})_{100-X}Cu_X$ alloy is additionally advantageous in that it offers superior resistance to demagnetization. It has a high coercive field of about 4000 Oe to about 7000 Oe, in comparison to the 2000 Oe to 2500 Oe of conventional CoCr or CoCrX alloys of prior art PM bias element designs.

Moreover, the $(Fe_{40}Pt_{60})_{100-X}Cu_X$ alloy has a sufficiently high Curie temperature which offers good thermal stability and offers acceptable resistance to corrosion resistance, making this material compatible with existing transducing head processes.

Figure 7:
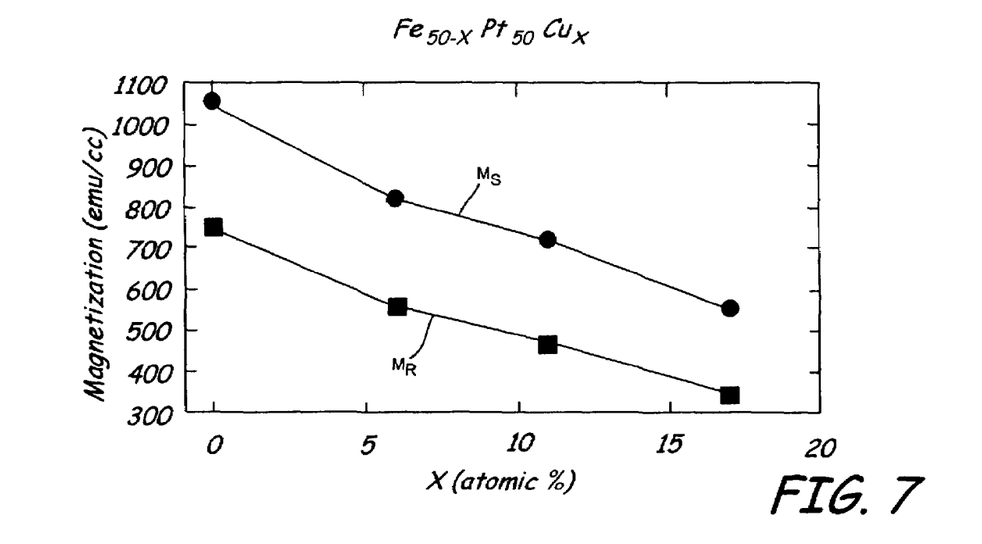
FIGS. 7 and 8 are graphs illustrating an effect of an atomic percentage X of copper in a $Fe_{50-X}Pt_{50}Cu_X$ alloy, deposited as a film, on saturation magnetization $M_S$, and remanent magnetization $M_R$ of the film, as well as coercivity $H_C$ of the film at various anneal temperatures.

FIGS. 7–12 illustrate the suitability of several other alloys in forming PM bias elements. FIG. 7 is a graph illustrating an effect of an atomic percentage X of copper in a $Fe_{50-X}Pt_{50}Cu_X$ alloy, deposited as a film, where the atomic percent of Pt is set at 50, on saturation magnetization $M_S$ and remanent magnetization $M_R$ of the film. The alloy illustrated in FIG. 7 was deposited as a film 500 Angstroms thick and annealed at 650° C. for ten minutes. As the atomic percentage X of copper in the film increases, the saturation magnetization Ms and remanent magnetization $M_R$ of the film decrease.

Figure 8:
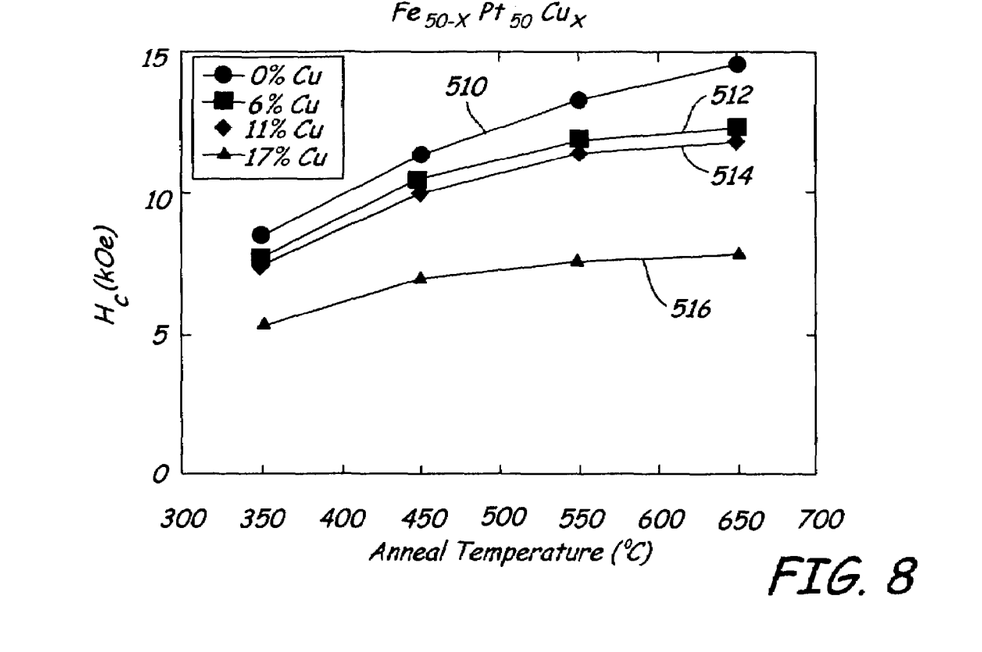

FIG. 8 is a graph illustrating the effect of an atomic percentage X of copper in a $Fe_{50-X}Pt_{50}Cu_X$ alloy, deposited as a film, on coercivity $H_C$ of the film at various anneal temperatures. The alloys illustrated in FIG. 8 were each deposited as a film 500 Angstroms thick and annealed at 650° C. for ten minutes. Line 510 of FIG. 8 represents a $Fe_{50}Pt_{50}$ film, while line 512 represents a $Fe_{44}Pt_{50}Cu_6$ film, line 514 represents a $Fe_{39}Pt_{50}Cu_{11}$ film, and line 516 represents a $Fe_{33}Pt_{50}Cu_{17}$ film. For a given anneal temperature, coercivity $H_C$ of the film decreases as an atomic percentage X of copper increases in the FePtCu film.

Figure 9:
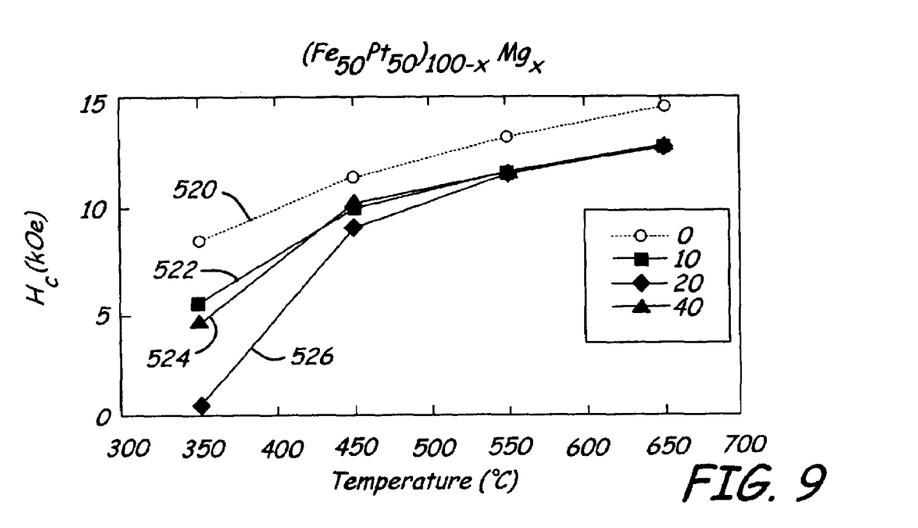
FIGS. 9 and 10 are graphs illustrating the effect of an atomic percentage X of magnesium in a $(Fe_{50}Pt_{50})_{100-X}Mg_X$ alloy, deposited as a film, on both the coercivity $H_C$ of the film at various anneal temperatures and on the saturation magnetization $M_S$ of the film.

FIG. 9 is a graph illustrating the effect of an atomic percentage X of magnesium in a $(Fe_{50}Pt_{50})_{100-X}Mg_X$ alloy, deposited as a film, on coercivity $H_C$ of the film at various anneal temperatures. The alloys illustrated in FIG. 9 were each deposited as a film 500 Angstroms thick, and were rapid thermal process (RTP) annealed for ten minutes at various temperatures. Line 520 of FIG. 9 represents a $Fe_{50}Pt_{50}$ film, while line 522 represents a $(Fe_{50}Pt_{50})_{90}Mg_{10}$ film, line 524 represents a $(Fe_{50}Pt_{50})_{80}Mg_{20}$ film, and line 516 represents a $(Fe_{50}Pt_{50})_{60}Mg_{40}$ film. For a given anneal temperature, coercivity $H_C$ of the film decreases as the atomic percentage X of magnesium increases in the FePtMg film.

Figure 10:
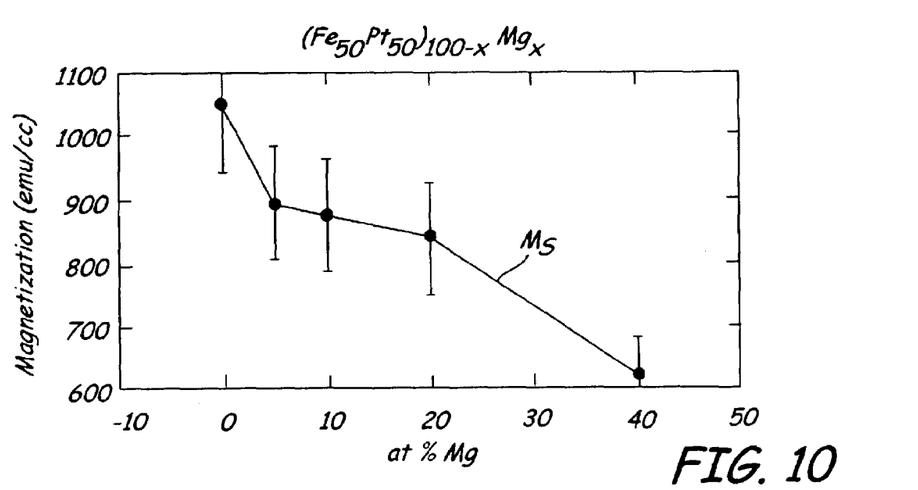

FIG. 10 is a graph illustrating the effect of an atomic percentage X of magnesium in a $(Fe_{50}Pt_{50})_{100-X}Mg_X$ alloy, deposited as a film, on saturation magnetization $M_S$ of the film. The alloys illustrated in FIG. 10 were each deposited as a film 500 Angstroms thick. As shown in FIG. 10, as the atomic percentage X of magnesium in the film increases, the saturation magnetization $M_S$ of the film decreases.

Figure 11:
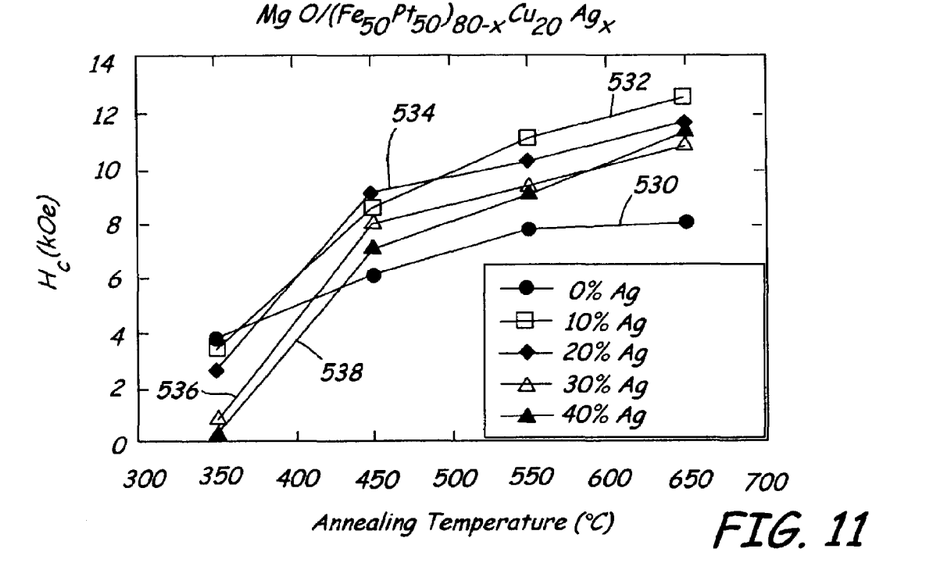
FIG. 11 is a graph illustrating the effect of an atomic percentage X of silver on a $(Fe_{50}Pt_{50})_{80-X}Cu_{20}Ag_X$ alloy, deposited as a film, on the coercivity $H_C$ of the film at various anneal temperatures.

FIG. 11 is a graph illustrating the effect of an atomic percentage X of silver on a $(Fe_{50}Pt_{50})_{80-X}Cu_{20}Ag_X$ alloy, deposited as a film, on the coercivity $H_C$ of the film at various anneal temperatures. The alloys illustrated in FIG. 11 were each deposited as a film 200 Angstroms thick on a 50 Angstrom thick MgO seedlayer and were RTP annealed for 10 minutes. Line 530 of FIG. 11 represents a $(Fe_{50}Pt_{50})_{80}Cu_{20}$ film, while line 532 represents a $(Fe_{50}Pt_{50})_{70}Cu_{20}Ag_{10}$ film, line 534 represents a $(Fe_{50}Pt_{50})_{60}Cu_{20}Ag_{20}$ film, line 536 represents a $(Fe_{50}Pt_{50})_{50}Cu_{20}Ag_{30}$ film, and line 538 represents a $(Fe_{50}Pt_{50})_{40}Cu_{20}Ag_{40}$ film. At 350° C., as the atomic percentage X of silver increases in the FePtCuAg film, the coercivity $H_C$ decreases. Similarly at higher anneal temperatures, the coercivity of the FePtCuAg film generally decreases as the atomic percentage of silver is increased. It is noted that the $(Fe_{50}Pt_{50})_{80}Cu_{20}$ film, at higher anneal temperatures, breaks this trend and has a lower coercivity $H_c$ than the films having greater percentages of silver.

Figure 12:
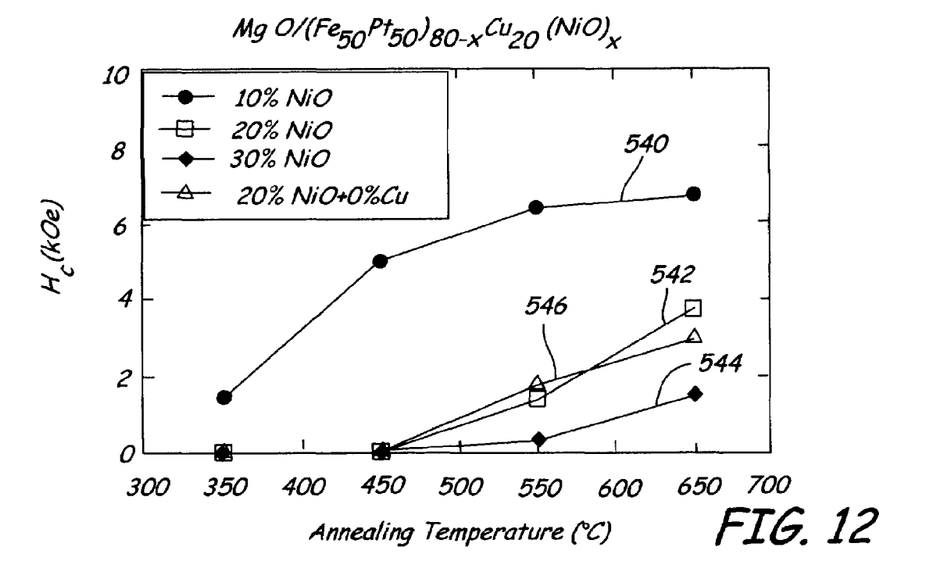
FIG. 12 is a graph illustrating the effect of an atomic percentage X of nickel-oxide on a $(Fe_{50}Pt_{50})_{80-X}Cu_{20}(NiO)_X$ alloy, deposited as a film, on the coercivity $H_C$ of the film at various anneal temperatures.

FIG. 12 is a graph illustrating the effect of an atomic percentage X of nickel-oxide on a $(Fe_{50}Pt_{50})_{80-X}Cu_{20}(NiO)_X$ alloy, deposited as a film, on the coercivity $H_C$ of the alloy at various anneal temperatures. The alloys illustrated in FIG. 12 were each deposited as a film 200 Angstroms thick on a 50 Angstrom thick MgO seedlayer and were RTP annealed for 10 minutes. Line 540 of FIG. 12 represents a $(Fe_{50}Pt_{50})_{70}Cu_{20}(NiO)_{10}$ film, line 542 represents a $(Fe_{50}Pt_{50})_{60}Cu_{20}(NiO)_{20}$ film, and line 544 represents a $(Fe_{50}Pt_{50})_{50}Cu_{20}(NiO)_{30}$ film. At a given anneal temperature, an increase in the atomic percentage X of NiO in the FePtCuNiO film results in a decrease in the coercivity $H_C$. Also illustrated in FIG. 12 is line 546 representing a $(Fe_{50}Pt_{50})_{80}(NiO)_{20}$ film.

Experimental data, literature, and ternary phase diagrams confirm that an iron-platinum alloy doped with at least one of gold, silver or magnesium will yield similar results as the $(Fe_{40}Pt_{60})_{100-X}Cu_X$ alloy described above. Furthermore, the properties of lead, zinc, bismuth, and antimony indicate that an iron-platinum alloy doped with at least one of these elements will also yield results similar to the $(Fe_{40}Pt_{60})_{100-X}Cu_X$ alloy described above.

Figure 13:
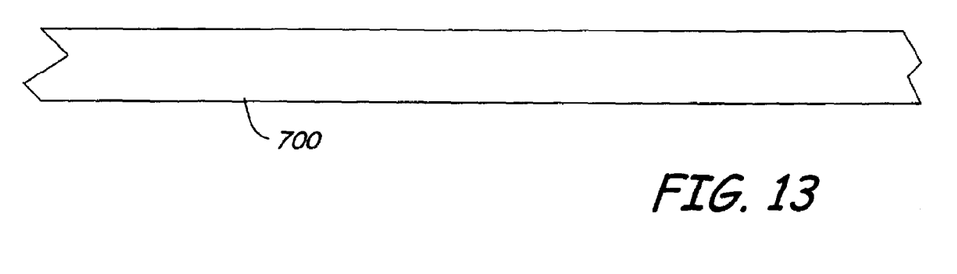
FIGS. 13–18 illustrate a method of forming a transducing head in accord with the present invention.
Figure 14:
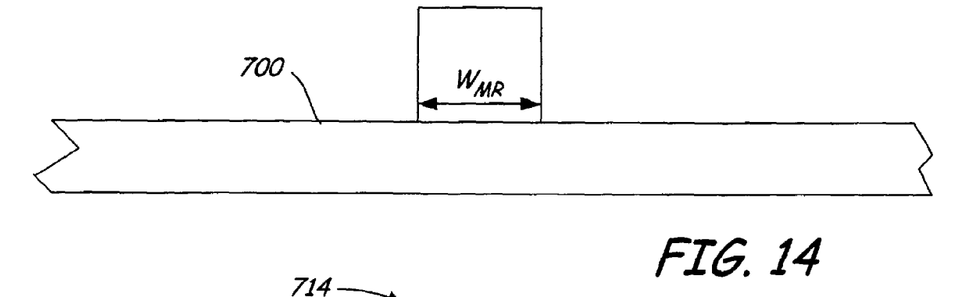
Figure 15:
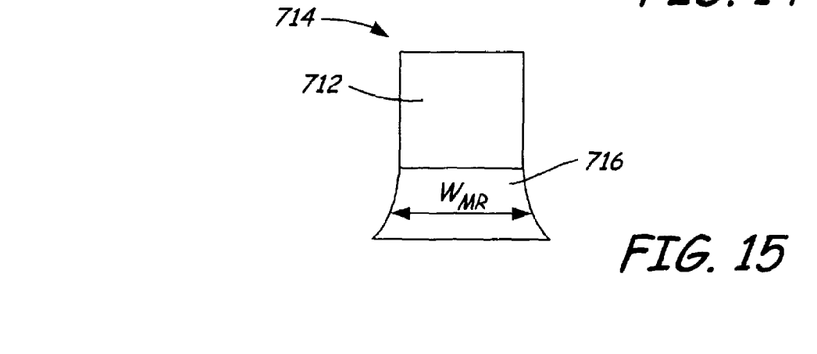
Figure 16:
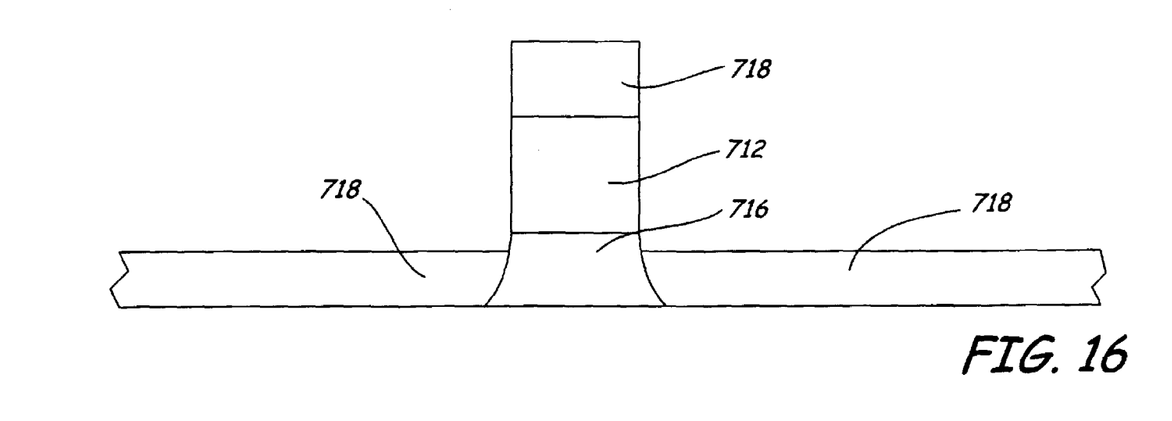
Figure 17:
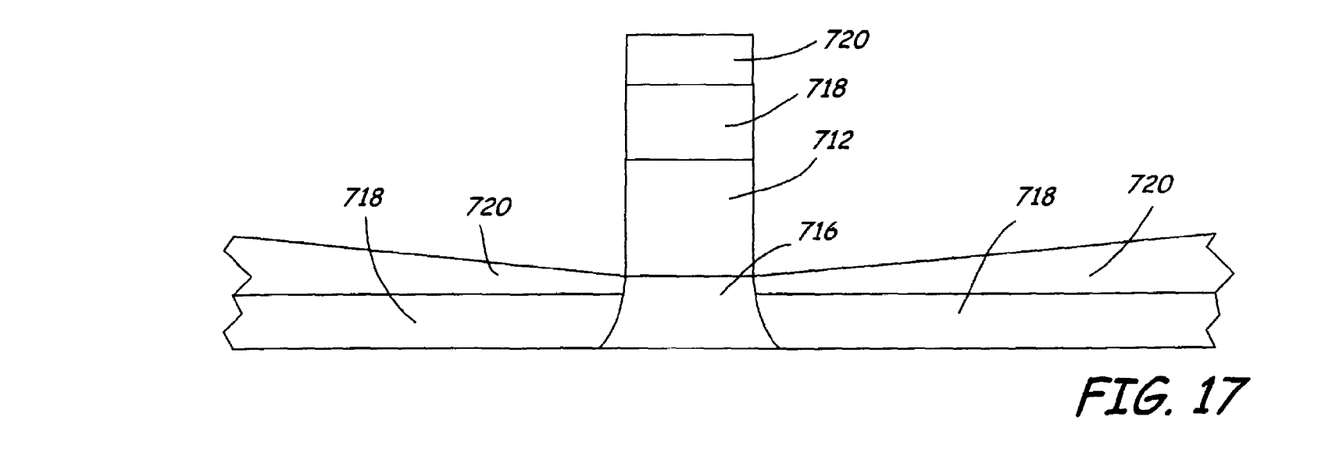
Figure 18:
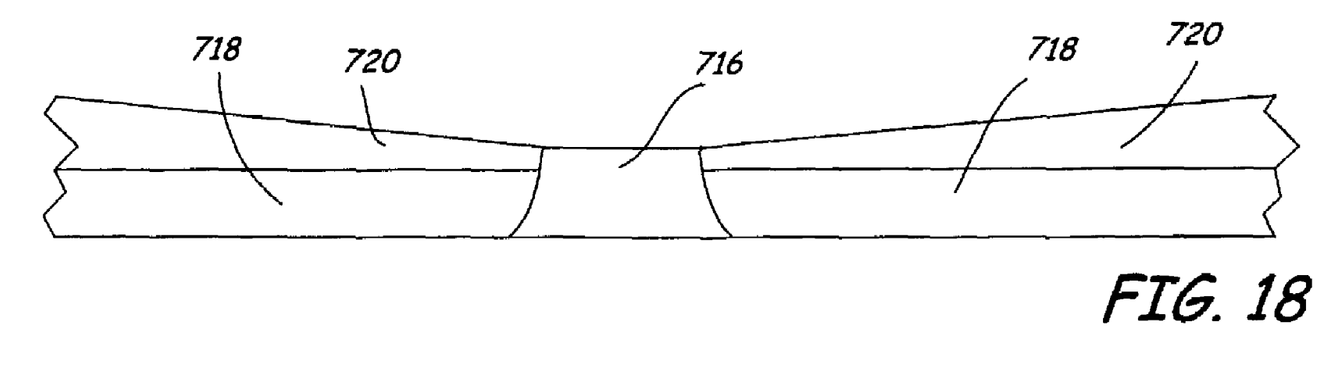

FIGS. 13–18 illustrate a method of forming a transducing head in accord with the present invention. FIG. 13 shows a first step, in which a plurality of MR sensor layers 700 are deposited on a substrate (not shown). FIG. 14 shows a following step in which a portion of MR sensor layers 700 is masked off by photoresist 712, wherein photoresist 712 defines MR sensor width $W_{MR}$. FIG. 15 shows the next step, in which structure 714 is milled, removing portions of MR sensor layers 700 that are not masked off. The result is MR sensor 716 with a MR sensor width $W_{MR}$. In FIG. 16, PM bias element material 718 is deposited, specifically, adjacent MR sensor 716 and on top of photoresist 712. FIG. 17 shows the next step, in which contact material 720 is deposited on PM bias element material 718. FIG. 18 shows the structure of FIG. 17 after photoresist 712, along with PM bias element material 718 and contact material 720 deposited thereon, are removed using conventional techniques. The structure of FIG. 18 is then annealed at a suitable temperature for a suitable time to cause a substantial amount of PM bias element material 718 to structurally transform to the $L1_0$ phase. To the extent that one of the plurality of layers of MR sensor 716 is an antiferromagnetic layer needing to be annealed, the annealing of PM bias element material 718 preferably occurs in the presence of a magnetic field in a desired direction of the magnetization of the antiferromagnetic layer.

In summary, by using a low remanent magnetic moment, high coercivity, corrosion resistant material in forming PM bias elements of a transducing head, the present invention is a solution for the position and asymmetry error associated with prior art designs associated with narrow read width transducing heads.

Although the present invention has been described with reference to preferred embodiments, workers skilled in the art will recognize that changes may be made in form and detail without departing from the spirit and scope of the invention.

The invention claimed is:

1. A transducing head comprising:
   a magnetoresistive sensor;
   a first bias element; and
   a second bias element, wherein the magnetoresistive sensor is positioned between the first bias element and the second bias element, and wherein the first bias element and the second bias element are formed of a permanent magnet material comprising an alloy comprising iron, platinum, and at least one element selected from a group consisting of copper, magnesium, gold, silver, lead, zinc, bismuth, and antimony, wherein an atomic percentage of the at least one element in the alloy is in a range of about 15 to about 60.

2. The transducing head of claim 1, wherein the permanent magnetic material has a coercivity in a range of about 2000 Oersteds to about 6000 Oersteds.

3. The transducing head of claim 1, wherein the alloy comprises iron, platinum, and copper.

4. The transducing head of claim 1, wherein the first bias element has a thickness in a range of about one to about three times a thickness of the magnetoresistive sensor and the second bias element has a thickness substantially equal to the thickness of the first bias element.

5. The transducing head of claim 1, and further comprising:
   a first seed layer upon which the first bias element is formed, wherein a thickness of the first seed layer is less than about 100 Angstroms; and
   a second seed layer upon which the second bias element is formed, wherein a thickness of the second seed layer is substantially equal to the thickness of the first seed layer.

6. The transducing head of claim 5 wherein the first seed layer magnetically decouples the first bias element from the magnetoresistive sensor and the second seed layer magnetically decouples the second bias element from the magnetoresistive sensor.

7. The transducing head of claim 1, wherein the permanent magnetic material includes a remanent magnetic moment in a range of about 200 emu/cm³ to about 800 emu/cm³.

8. The transducing head of claim 1, wherein the permanent magnetic material comprises an $L1_0$ phase.

9. The transducing head of claim 8, wherein the permanent magnetic material comprises an ordering temperature of less than about 600° C.

10. The transducing head of claim 8, wherein the permanent magnetic material comprises an ordering temperature of less than about 600° C.

11. A transducing head comprising:
a magnetoresistive sensor;
a first bias element; and
a second bias element, wherein the magnetoresistive sensor is positioned between the first bias element and the second bias element, and wherein the first bias element and the second bias element are each formed of a permanent magnetic material comprising a first alloy comprising iron, platinum and a second alloy, the second alloy comprising copper and at least one element selected from a group consisting of magnesium, gold, silver, nickel-oxide, lead, zinc, bismuth, and antimony.

12. The transducing head of claim 11, wherein an atomic percentage of the second alloy in the first alloy is in a range of 0 to about 60.

13. The transducing head of claim 11, wherein an atomic percentage of the second alloy in the first alloy is in a range of about 15 to about 40.

14. The transducing head of claim 11, wherein the alloy is in an iron-platinum $L1_0$ phase having an ordering temperature less than about 600° C.

15. The transducing head of claim 11, wherein the alloy has a remanent magnetic moment in a range of about 200 emu/cm$^3$ to about 800 emu/cm$^3$.

16. The transducing head of claim 11, wherein the alloy has a coercivity in a range of about 200 Oersteds to about 6000 Oersteds.

17. The transducing head of claim 11, wherein the first bias element has a thickness in a range of about one to about three times a thickness of the magnetoresistive sensor and the second bias element has a thickness substantially equal to the thickness of the first bias element.

18. The transducing head of claim 11, and further comprising:
a first seed layer upon which the first bias element is formed, wherein a thickness of the first seed layer is less than about 100 Angstroms; and
a second seed layer upon which the second bias element is formed, wherein a thickness of the second seed layer is substantially equal to the thickness of the first seed layer.

19. The transducing head of claim 18, wherein the first seed layer magnetically decouples the first bias element from the magnetoresistive sensor and the second seed layer magnetically decouples the second bias element from the magnetoresistive sensor.

20. A method for forming a transducing head comprising:
depositing and defining a sensor width of a magnetoresistive sensor, the magnetoresistive sensor comprising an antiferromagnetic layer;
depositing first and second bias elements adjacent opposite ends of the magnetoresistive sensor, wherein the first and second bias elements are each formed of a permanent magnetic material having a remanent magnetic moment in a range of about 200 emu/cm$^3$ to about 800 emu/cm$^3$ and comprising an alloy comprising iron, platinum, and at least one element from a group consisting of copper, magnesium, gold, silver, lead, zinc, bismuth, and antimony, wherein an atomic percentage of the at least one element in the alloy is in a range of about 15 to about 60; and
annealing the transducing head at a temperature in a range of about 280° C. to about 600° C. in the presence of a magnetic field to set a magnetization of the antiferromagnetic layer of the magnetoresistive sensor and to transform the permanent magnetic material into an iron-platinum $L1_0$ phase.

21. The method of claim 20, wherein the permanent magnetic material has a coercivity in a range of about 2000 Oersteds to about 6000 Oersteds.

22. The method of claim 20, wherein the permanent magnetic material is an alloy comprising iron, platinum, and copper.

23. The method of claim 20, wherein the first bias element has a thickness in a range of about one to about three times a thickness of the magnetoresistive sensor and the second bias element has a thickness substantially equal to the thickness of the first bias element.

24. A transducing head comprising:
a magnetoresistive sensor;
a first bias element; and
a second bias element, wherein the magnetoresistive sensor is positioned between the first bias element and the second bias element, and wherein the first bias element and the second bias element are formed of a permanent magnet material comprising an alloy comprising iron, platinum, and at least one element selected from a group consisting of copper, magnesium, gold, silver, lead, zinc, bismuth, and antimony, wherein an atomic percentage of the at least one element in the alloy is at least eleven.

25. The transducing head of claim 24, wherein the permanent magnetic material has a coercivity in a range of about 2000 Oersteds to about 6000 Oersteds.

26. The transducing head of claim 24, wherein the alloy comprises iron, platinum, and copper.

27. The transducing head of claim 24, wherein the permanent magnetic material includes a remanent magnetic moment in a range of about 200 emu/cm$^3$ to about 800 emu/cm$^3$.

28. The transducing head of claim 24, wherein the permanent magnetic material comprises an $L1_0$ phase.

29. The transducing head of claim 24, wherein the first bias element has a thickness in a range of about one to about three times a thickness of the magnetoresistive sensor and the second bias element has a thickness substantially equal to the thickness of the first bias element.

30. The transducing head of claim 24, and further comprising:
a first seed layer upon which the first bias element is formed, wherein a thickness of the first seed layer is less than about 100 Angstroms; and
a second seed layer upon which the second bias element is formed, wherein a thickness of the second seed layer is substantially equal to the thickness of the first seed layer.

31. The transducing head of claim 30 wherein the first seed layer magnetically decouples the first bias element from the magnetoresistive sensor and the second seed layer magnetically decouples the second bias element from the magnetoresistive sensor.

* * * * *

UNITED STATES PATENT AND TRADEMARK OFFICE
CERTIFICATE OF CORRECTION

| | |
|---|---|
| PATENT NO. | : 7,035,061 B2 |
| APPLICATION NO. | : 10/464343 |
| DATED | : April 25, 2006 |
| INVENTOR(S) | : Eric W. Singleton et al. |

Page 1 of 1

It is certified that error appears in the above-identified patent and that said Letters Patent is hereby corrected as shown below:

Column 11, Line 33, delete "200", insert --2000--

Signed and Sealed this

Twenty-sixth Day of December, 2006

JON W. DUDAS
*Director of the United States Patent and Trademark Office*